March 8, 1949.  T. A. DICKSON  2,463,526
PULP SCREENING APPARATUS
Filed Jan. 9, 1945  3 Sheets-Sheet 1

THOMAS A. DICKSON
INVENTOR.

BY
ATTORNEY

March 8, 1949.　　　　T. A. DICKSON　　　　2,463,526
PULP SCREENING APPARATUS
Filed Jan. 9, 1945　　　　　　　　　　　　3 Sheets-Sheet 3

THOMAS A. DICKSON
INVENTOR.

BY
ATTORNEY

Patented Mar. 8, 1949

2,463,526

UNITED STATES PATENT OFFICE 2,463,526

PULP SCREENING APPARATUS

Thomas A. Dickson, Denver, Colo., assignor to Colorado Iron Works Company, Denver, Colo., a corporation of Maine Application January 9, 1945, Serial No. 572,016

1 Claim. (Cl. 209—233)

This invention relates to a method and apparatus for screening, or separating the smaller particles from the larger particles of a pulp comprising a liquid carrying particles of differing size, as by the action of a screen. The present invention is an improvement upon the process and apparatus described and claimed in Deitz U. S. Patent No. 1,710,208, granted April 23, 1929.

In the prior patented process and apparatus, the separation of smaller particles from larger particles of the pulp is accomplished by moving a screen transversely to a flowing stream of such pulp, such as by reciprocating or oscillating the screen. Due to such oscillation, the screen will not clog or blind, and particles smaller than the openings in the screen tend to pass therethrough while the screen will reject particles the same size as, or even slightly smaller than, the screen openings. Generally, there is a minimum speed of movement of the screen below which the screen tends to clog for any given rate of pulp stream flow. In the commercial embodiment of the invention of the prior patent and also the present invention, the screen is preferably cylindrical and is reciprocated through a small angle about a central vertical axis, the screen being mounted in upright position in a tank adapted to receive the incoming pulp. The lower end of the screen is blocked off and a central outlet is provided through which pulp liquid and particles passing through the screen are drawn off. The rejected particles fall to the bottom of the tank, below the screen, and are removed through an outlet at the bottom of the tank. It will be understood, however, that the principles of this invention, in the same manner as the invention of the prior patent, are applicable to other type screens, such as a flat screen which extends across a channel or tank in which the pulp body is flowing.

It has been found that, in carrying out the method and apparatus of the prior patent, the screen operates quite successfully with a normal steady flow of pulp containing a substantially uniform range of particle sizes. However, variation in the amount of particles of a particular size, and/or variation in the rate of pulp flow, tends to produce a variation in the level of pulp on opposite sides of the screen. In the commercial embodiment, wherein the smaller size particles pass from the outside to the inside of the screen, it has been found that a difference of more than one inch in the level of pulp between the inside and outside of the screen tends to cause the screen to clog. Also, adjustments in the pulp levels inside and outside the screen, by means of manually-operated discharge valves, are difficult if not impossible to accomplish successfully in continuous operation, particularly when the density of the pulp changes frequency, or the amount of pulp passing to the apparatus differs or varies over a substantial range.

Among the objects of this invention are to provide a method of and apparatus constituting an improvement over the invention of the prior patent, wherein the differential between the pulp levels on opposite sides of the screen are maintained within sufficiently close limits to prevent blinding or clogging of the screen; to provide such a method and apparatus wherein changes in the pulp flow, density, or particle size range is compensated for; to provide such a method and apparatus wherein substantially constant head pressures are maintained on opposite sides of the reciprocating screen; to provide such a method and apparatus wherein the above objects are accomplished automatically; to provide such a method and apparatus wherein particles below a predetermined size are separated out irrespective of variations in the amount of such particles in the incoming pulp; to provide apparatus for carrying out the method of this invention in an effective manner; and to provide such apparatus which is relatively simple in construction, is easy to adjust, and the effectiveness of operation of which can be determined accurately. Other objects and the novel features of this invention will be apparent from the description which follows.

The method of the present invention comprises, broadly, establishing a body of pulp tending to flow through a screen, imparting movement to the screen in a direction transverse to the flow of pulp therethrough, and establishing a hydraulic head to regulate the level of pulp on the discharge side, or after passage through, the screen. Preferably, the material establishing the hydraulic head is the same material as that which passes through the screen, and a separate but similar hydraulic head is established to regulate the level of pulp on the inlet side, or prior to passage through, the screen. In further accordance with this invention, the level of the pulp bodies, both prior and subsequent to passage through the screen, are automatically regulated by controlling the discharge or flow of pulp from the lower portion of the two pulp bodies, prior and subsequent to passage through the screen. The foregoing method may be carried out in apparatus constructed in accordance with this invention and illustrated in the accompanying drawings, in which:

Figure 1:
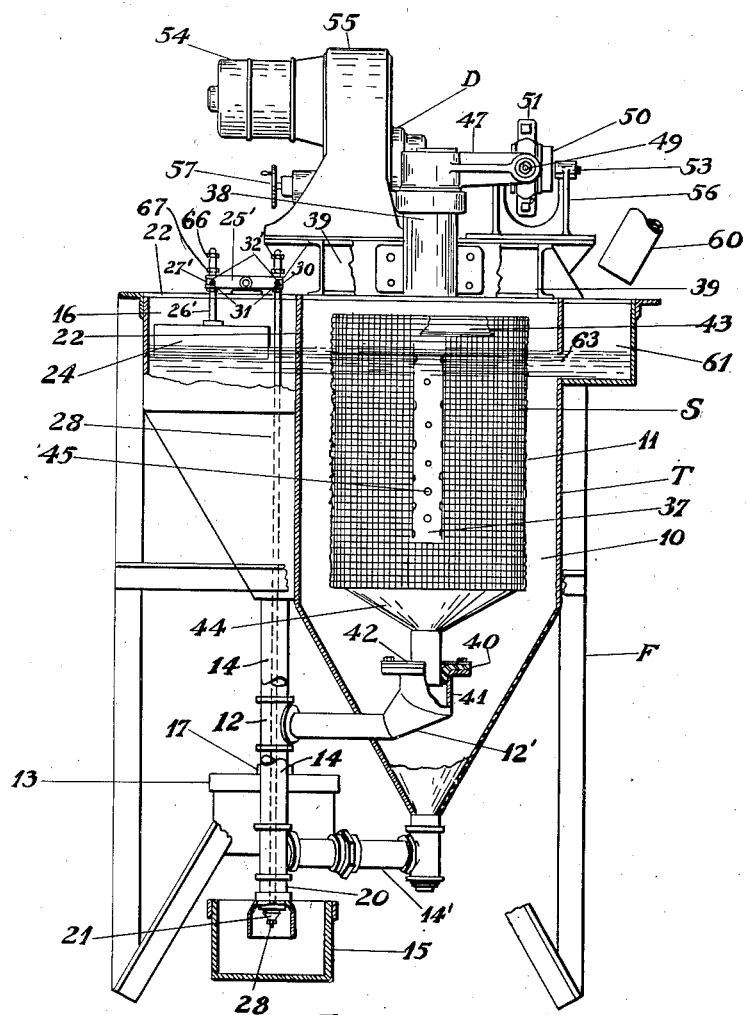
Figure 1 is a front elevation, partly in vertical section and partly broken away to show the interior construction of an embodiment of this invention taken approximately along the line 1—1, Fig. 2.

The apparatus illustrated in the drawings includes a tank T having a central compartment 10 adapted to contain a body of pulp to be treated. A cylindrical screen assembly S is vertically mounted in the tank and is reciprocable about its vertical axis by a drive mechanism D. The tank may be supported on a framework F, and the drive mechanism mounted on top the framework. The smaller particles which pass through a screen 11 of the screen assembly along with a portion of the pulp liquid, are discharged from the lower end of the screen assembly to pass through conduits 12 and 12' to an upper launder or trough 13, while the particles rejected by the screen drop to the bottom of the compartment 10 to pass through conduits 14 and 14' to a lower launder or trough 15. The action of the screen is substantially as described in the prior patent, No. 1,710,208, i. e., the reciprocation of the screen, or movement thereof transverse to the direction of flow of particles therethrough, causes particles the same size as or slightly smaller than the openings in the screen to pass through, and causes larger particles to be rejected by the screen, and also apparently prevents the screen from becoming blinded by the larger particles.

Figure 2:
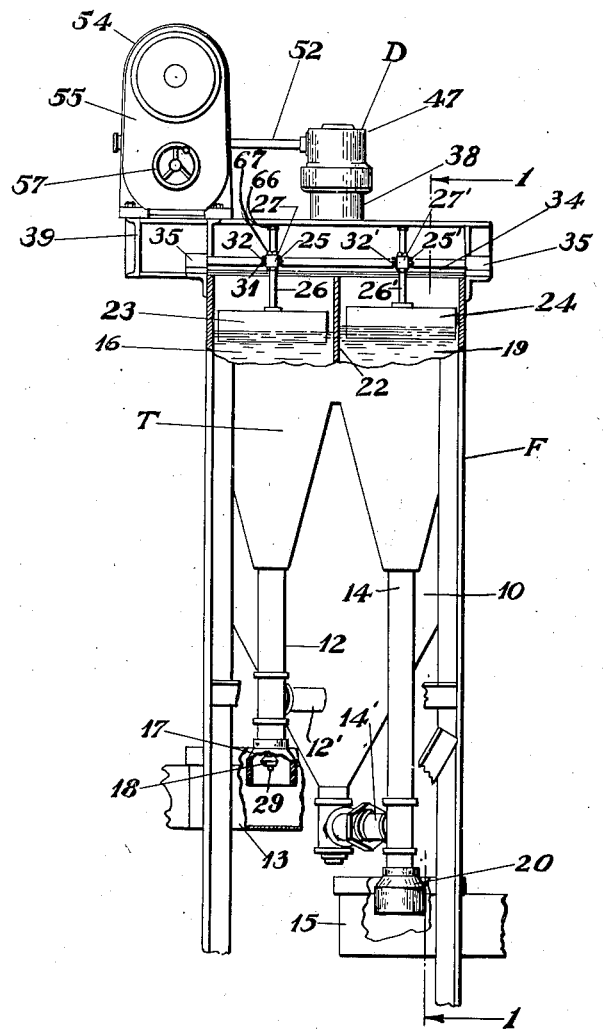
Figure 2 is a similar end elevation of the apparatus of Figure 1, partially broken away to show interior parts.

In accordance with this invention, the hydraulic head for maintaining the level of pulp within the screen is established in an auxiliary tank, such as a compartment 16 of tank T, the lower end of which is connected by conduits 12 and 12' with the lower end of the screen assembly S, as in Figures 1 and 2. At substantially its lowest point, the conduit 12 is provided with an outlet 17, the flow through which is controlled by a discharge valve 18. Similarly, a hydraulic head in the central compartment 10, which contains incoming pulp, is established in a separate tank, such as a second compartment 19. The lower end of compartment 19 is connected with the lower end of central compartment 10 by conduits 14' and 14, the latter being provided at substantially its lowest point with an outlet 20, and flow therethrough being controlled by a valve 21. The hydraulic heads maintained by the auxiliary tanks or compartments and connecting conduits tend to stabilize the level of pulp, on each side of the screen, by resisting any tendency toward change in pulp level.

Figure 3:
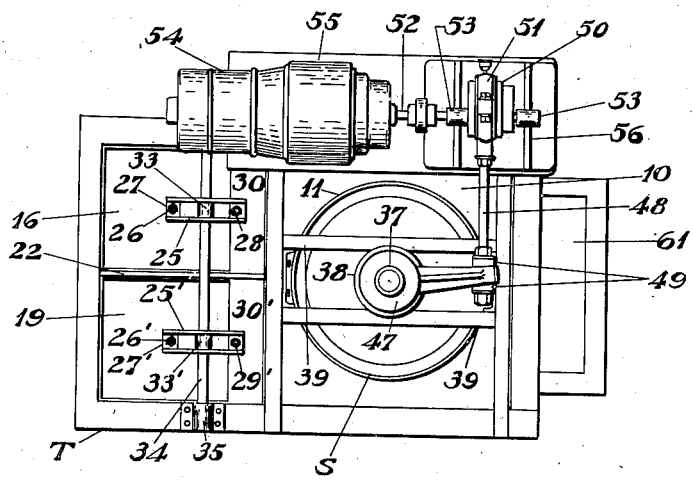
Figure 3 is a top plan view of the apparatus of Figure 1.

The separate compartments for establishing the regulatory hydraulic heads are preferably formed by suitable divisions of tank T, such as partitions 22; and such separate compartments are preferably disposed side by side at one end of the tank, as in Figures 2 and 3, so that the pulp levels, including any difference between the pulp levels inside and outside the screen, may be determined accurately by comparing the level of pulp within the side by side compartments. This is a particular advantage of the construction of the present invention, since it enables the operator to determine at a single glance whether or not the pulp level on opposite sides of the screen are sufficiently close together to prevent blinding or clogging of the screen. Such feature also is of particular advantage when the level of material in the two compartments is being adjusted initially, since it permits the apparatus to be set up for initial operating conditions quickly and effectively.

In further accordance with this invention, the hydraulic heads, which correspond to the pulp levels inside and outside the screen, are automatically maintained by float controls, which may include floats 23 and 24, respectively located in compartments 16 and 19, as in Figures 2 and 3. To control discharge valves 18 and 21, each float is connected by a threaded rod 26 or 26' upon which a pivot block 27 or 27' is adjustably mounted, said blocks being of H shape as indicated in Figs. 1 and 3, the respective levers are connected with valves 21 and 18 by rods 28 and 29, respectively. The upper end of each rod is threaded for adjustable mounting of a pivot block 30 or 30', the levers 25 or 25' being identical in construction and including parallel arms provided with slots 31 into which pins 32 or 32' of blocks 27 or 27' and 30 or 30' extend, as in Figures 1 and 2. Each pivot block is adjustable vertically on the respective rod by suitable means, such as adjusting and locking nuts 66 or 66' and 67 or 67' respectively, as shown, while each lever 25 or 25' includes a central bushing 33 or 33' which is adapted to pivot about a horizontal shaft 34, as in Figure 3. Shaft 34 extends transversely to the lever arms, and is attached to the outer walls of each head compartment by mounting blocks 35. Rods 28 and 29 extend downwardly through the material in the respective compartment and into one of the outlets, discharge valve 18 being attached to the lower end of rod 29 and discharge valve 21 being similarly attached to the lower end of rod 28. As will be evident, the discharge valves are opened and closed inversely in accordance with the level of material in the hydraulic head compartments—that is, when the hydraulic head is higher than a predetermined normal, the respective discharge valve will tend to be opened further, and when the hydraulic head is lower than normal, the discharge valve will tend to be closed. This causes the hydraulic head to rise or fall, as the case may be, in accordance with the flow of material from the outlet, to correct any tendency for deviation from the desired level in the tank or within the screen.

By means of the adjustable pivot blocks 27 and 30, the extent to which either discharge valve is opened at any predetermined hydraulic head may be adjusted accurately. Since it is desirable that the level of the pulp inside and outside the screen be substantially the same, adjustment of the blocks 27 and 30 is readily made, particularly since compartments 16 and 19 are adjacent to each other, so that hydraulic heads and any differences therebetween may be compared accurately. Normally, after an initial adjustment is made, the hydraulic heads will be maintained at the desired level, irrespective of changes in the specific gravity of the pulp or variations in the amounts of the different sizes of particles therein. Due to the location of the hydraulic head compartments, the level of the heads may be observed and compared readily, by the operator, to insure that particularly abnormal changes will not cause too great a disparity between the heads. Also, the observation of the hydraulic heads may serve as a check upon other apparatus, such as a grinding mill, or the like, as any radical changes in the amount of particles, or the like, will be reflected in the operation of the floats.

The screen 11 preferably comprises a suitable wire mesh, cylindrical in shape, and the screen assembly includes a vertical pipe 37 for supporting the screen, as in Figure 1. Pipe 37 is suspended from a bearing 38, mounted on superstructure 39 extending across the top of framework F, see Fig. 3. The lower end of pipe 37 extends into conduit 12, and a seal is provided by a ring 40 formed of rubber or other suitable material, which encloses the lower end of the pipe and the inner portion of which is bent downwardly by the pipe, see Fig. 1. Ring 40 is held in position by being clamped to an outwardly extending flange 41 of the outlet by a clamping ring 42. The upper end of the screen is maintained in circular shape by a circular channel 43 to which the screen is attached in a suitable manner, as by welding, and from which braces, or the like, may extend to the supporting pipe 37. The lower end of the screen may be suitably attached, as by welding, to a conical plate 44, which supports the screen and is attached, in turn, to pipe 37. Pipe 37 may be provided with holes or perforations 45, which permit the flow of screened pulp to the outlet, and which extend along that portion of the pipe within the screen, and preferably down to the upper surface of conical plate 44, as seen in Fig. 1. During reciprocation of the screen, the sealing ring 40 prevents pulp containing only smaller particles and already passed through the screen from re-entering the main body of pulp in tank T, and also prevents passage of unscreened pulp to conduit 12.

Figure 4:
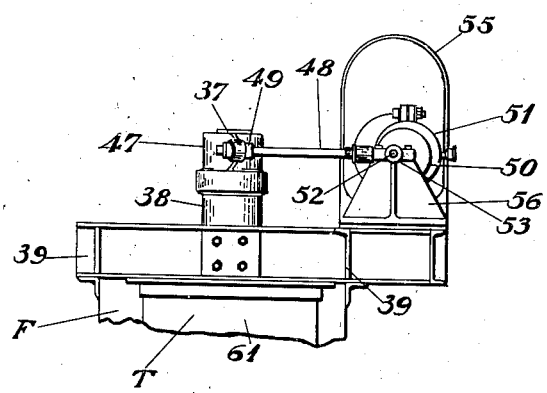
Figure 4 is a rear elevation of the uppermost portion of the apparatus of Figure 1.

For reciprocating the screen, a lever 47 is keyed, or otherwise attached, to the upper end of pipe 37 above bearing 38, the lever being reciprocated by a crank 48 attached to the lever by a double socket joint 49, as in Figures 1, 3 and 4. The crank is reciprocated by an adjustable eccentric 50, adjustment of which determines the amplitude of oscillation of screen assembly S. A sleeve bearing 51 encircles the eccentric and is attached to the end of the crank, while the eccentric is mounted upon and rotated by a shaft 52, the speed of rotation of which determines the period of oscillation of the screen. Shaft 52 is mounted in journal bearings 53, and is rotated at a suitable speed by a motor 54, preferably acting through a speed reducer 55. The motor 54 and speed reducer 55, as well as a support 56 for bearings 53, may be mounted on I-beams 39, while joint 49 may be constructed so as to be readily taken apart, and the central beams upon which bearing 38 is mounted also may be removably attached to the remaining I-beams to form a removable bridge, so that the pipe 37 and screen assembly S may be readily lifted from the apparatus for inspection or repair.

For regulating the speed of shaft 52, which, in turn, determines the oscillating period of the screen, speed reducer 55 is provided with an adjusting wheel 57. Thus, through the adjusting wheel 57 and adjustable eccentric 50, the amplitude and oscillations of the screen may be adjusted, with the result that the apparatus may be set for any particular set of conditions. Of course, maintenance of the pulp levels inside and outside the screen with a minimum differential is also important, for satisfactory operation, as well as adjustment of the speed and amplitude of screen oscillations. In making such adjustments, it must be borne in mind that, as set forth in Patent No. 1,710,208, a screen of this type tends to clog if the number of oscillations per minute is reduced below a certain minimum, depending upon the particle size which is to be permitted to pass through the screen, the density of the pulp, and the amount of pulp to be treated.

The pulp is fed initially to the tank T in any suitable manner, such as through a pipe 60 which feeds pulp into an intake trough 61, extending along the end of tank T opposite the hydraulic head compartments. Of course, any other suitable manner of feeding pulp to the tank T may be utilized, such as that of Patent No. 1,710,208.

During operation of the apparatus, the feed pulp will pass into intake trough 61 from inlet pipe 60 and thence through an opening 63 into compartment 10 of tank T. The flow of liquid through the screen tends to carry the feed pulp toward the screen, and as the finer particles pass through the screen and the larger particles are rejected, each will tend to settle—the finer particles settling inside the screen and the larger particles settling outside thereof. The flow of liquid through holes 45 in pipe 37 will carry the finer particles into the pipe and the screened pulp will pass through conduit 12 to compartment 16 and/or discharge through outlet 17 into launder 13. The flow of screened pulp through conduit 12 will maintain the hydraulic head in compartment 16, and the level of pulp within the screen will be maintained substantially constant, irrespective of variations in the amount of pulp passing through holes 45, through regulation of discharge valve 18 by float 23. At the same time, the larger particles will settle downwardly in compartment 10, and along with a portion of the liquid pass through conduit 14 into compartment 19, and/or discharge through outlet 20 to launder 15. The flow of unscreened pulp through conduit 14 will similarly maintain the hydraulic head in compartment 19, and the level of the main body of pulp will remain substantially constant through the action of float 24 and valve 21.

From the foregoing, it will be apparent that the apparatus of this invention operates substantially automatically after an initial setting, irrespective of usual variations in the quantity and/or size of particles in the pulp, or the amount of pulp fed. It will be understood that for any radically different set of conditions, additional setting or adjustment may be necessary, but for normal operations, as in a mill, the initial setting will suffice.

Although the method and apparatus described herein utilizes a hydraulic head for controlling the level of pulp, both inside and outside the screen, it will be understood that only one hydraulic head, preferably acting upon the inside or discharge side of the screen, may be utilized. Also, although the same material as that inside or outside the screen is utilized in maintaining the respective hydraulic head, it will be understood that different material may be used. For instance, if it is desired to mix additional liquid with the screened or rejected pulp, such liquid may be fed into the hydraulic head compartment to pass through outlet 17 or 20 and mix with the respective pulp involved.

It will be further understood that other variations, both in the method and the apparatus, may be made without departing from the spirit and scope of this invention.

What is claimed is:

Apparatus for screening pulp containing particles of different size, comprising a tank adapted to contain a body of pulp to be screened and having a pair of side by side compartments, one of which compartment is connected with said tank at the lower end thereof, a cylindrical screen within said tank connected at the lower end with the other compartment, a substantially cone-shaped metal plate connected to the lower end of the screen for supporting the same, means for moving said screen transversely to the normal direction of movement of particles through said screen, an outlet provided with a mechanically actuated valve arranged to discharge pulp flowing from the lower end of said tank and an outlet provided with a mechanically actuated valve arranged to discharge pulp flowing from said screen, including control floats in each of said compartments for controlling the corresponding discharge valve in response to level fluctuations in said compartments.

THOMAS A. DICKSON.

REFERENCES CITED

The following references are of record in the file of this patent:

UNITED STATES PATENTS

| Number | Name | Date |
| --- | --- | --- |
| 1,065,288 | Whitton | June 17, 1913 |
| 1,710,208 | Deitz | Apr. 23, 1929 |
| 1,886,174 | Flint et al. | Nov. 1, 1932 |
| 1,935,235 | Willmann | Nov. 14, 1933 |

FOREIGN PATENTS

| Number | Country | Date |
| --- | --- | --- |
| 268,663 | Great Britain | Apr. 7, 1927 |